United States Patent [19]

Black et al.

[11] 4,347,620

[45] Aug. 31, 1982

[54] METHOD OF AND APPARATUS FOR REGENERATING A SIGNAL FREQUENCY IN A DIGITAL SIGNAL TRANSMISSION SYSTEM

[75] Inventors: David H. A. Black, Chelsea; Georges H. Pelletier, Aylmer; Hing F. Lee, Ottawa, all of Canada

[73] Assignee: Northern Telecom Limited, Montreal, Canada

[21] Appl. No.: 187,815

[22] Filed: Sep. 16, 1980

[51] Int. Cl.³ .............................................. H04L 7/00
[52] U.S. Cl. .................................... 375/112; 370/102
[58] Field of Search ..................... 331/1 A, 25, 30, 31; 370/102, 108; 375/112, 118, 119

[56] References Cited

U.S. PATENT DOCUMENTS

| | | | |
|---|---|---|---|
| 3,420,956 | 1/1969 | Heightley et al. | 375/112 |
| 3,873,773 | 3/1975 | Guy, Jr. | 370/102 |
| 3,961,136 | 6/1976 | Cohen et al. | 375/112 |
| 4,086,436 | 4/1978 | Cohen et al. | 370/102 |
| 4,095,053 | 6/1978 | Duttweiler et al. | 370/102 |
| 4,224,473 | 9/1980 | Kaul et al. | 370/102 |

Primary Examiner—Benedict V. Safourek
Attorney, Agent, or Firm—R. John Haley

[57] ABSTRACT

In a digital signal transmission system, digital signals at a first frequency are synchronized to a second, slightly higher, frequency for transmission in frames and superframes, positive stuffing being effected one frame at a time at a slow rate. At the receiver, the received signals, but not stuffed frames, are written into a memory and the signals are read from the memory at the first frequency. The first frequency at the receiver is generated using an oscillator whose frequency is controlled in dependence upon a comparison of the relative phases of writing into and reading from the memory. The digital signals at the first frequency are derived from an incoming bit stream having a frequency which is higher than the first and second frequencies, by omitting synchronizing bits from the incoming bit stream.

8 Claims, 4 Drawing Figures

METHOD OF AND APPARATUS FOR REGENERATING A SIGNAL FREQUENCY IN A DIGITAL SIGNAL TRANSMISSION SYSTEM

This invention relates to a method of and apparatus for generating, at a receiver of a digital signal transmission system in which digital signals at a first frequency are synchronized with positive stuffing to a second, slightly higher, frequency for transmission, a signal at the first frequency.

In digital signal transmission systems it is commonly required to transmit via a transmission link one or more incoming digital signals which are asynchronous to the timing of the transmission link. In order to effect transmission, without loss of information, in these circumstances, it is known to transmit the signals at a higher frequency than that at which they occur, and to effect positive stuffing at the transmitter to make up the frequency difference. At the receiver, in a destuffing process, the stuffed information is removed and the digital signals are desynchronized to their original frequency, which is regenerated at the receiver.

The regeneration of this original frequency is dependent upon the stuffing rate, which itself depends upon the frequency difference. If the frequency difference is relatively small, and hence the stuffing rate is low, a stable regeneration of the original frequency is rendered difficult. This problem is exacerbated if stuffing is effected on a frame basis, a whole frame of information being stuffed at a time, resulting in a very low frame stuffing rate.

For example, in a digital speech interpolation (DSI) transmission system as described and claimed in co-pending U.S. patent application Ser. No. 187,821 filed concurrently herewith, the disclosure of which is incorporated herein by reference, two digital signal streams each having a nominal and average frequency of 1.536 MHz, and each derived from an incoming bit stream at a nominal frequency of 1.544 MHz by omission of every 193rd bit which is a synchronizing bit, are each synchronized with positive stuffing to a nominal and average frequency of 1.536885 MHz, before being multiplexed and processed for transmission via a single transmission link at a nominal frequency of 1.544 MHz. In this system, therefore, the average stuffing rate is 1536885−1536000=885 bits per second. However, in this system stuffing is effected on a frame basis, each frame comprising 192 bits, so that the average frame stuffing rate is 885/192≃4.6 frames per second, which is very low.

Accordingly, an object of this invention is to provide an improved method of and apparatus for regenerating the original, or first, frequency in a digital transmission system as recited above.

According to this invention there is provided in a digital signal transmission system in which digital signals at a first frequency are synchronized with positive stuffing to a second, slightly higher, frequency for transmission, a stuffing signal is transmitted to identify the location of each item of stuffed information, and received signals at said second frequency are desynchronized to said first frequency by writing the received signals, but not the stuffed information, into a memory and reading signals from the memory at the first frequency, a method of producing a first signal at the first frequency at a receiver of the system comprising the steps of: producing from the received signals a second signal at said second frequency; comparing the relative phases of writing into and reading from the memory in respect of each stuffing signal; producing a third signal at a frequency which is dependent upon the stuffing frequency modified in dependence upon each comparison of said relative phases; generating said first signal using an oscillator; and controlling the oscillation frequency of the oscillator in dependence upon phase differences between the first signal and the second signal reduced in frequency by the frequency of the third signal.

A signal at the difference frequency of the second and third signals need not be separately produced. For example, in a preferred embodiment of the invention described hereinafter the step of controlling the oscillation frequency of the oscillator comprises the steps of: producing from the second and third signals a fourth signal having a frequency which is equal to the frequency difference of the second and third signals divided by a predetermined number; frequency dividing the first signal by said predetermined number to produce a fifth signal; and comparing the phases of the fourth and fifth signals to produce a control signal for controlling the oscillation frequency of the oscillator. In this case the fourth signal can be produced directly from the second and third signals.

In a case where the digital signal transmission system derives the digital signals at the first frequency from an incoming bit stream having a fourth frequency which is a predetermined amount higher than the first frequency, such as in a DSI transmission system as discussed above, the step of generating the first signal using the oscillator preferably comprises the step of reducing the frequency of an output signal of the oscillator by the predetermined amount to produce the first signal, whereby said output signal of the oscillator has said fourth frequency. In this manner both the first frequency and the fourth frequency are conveniently regenerated at the receiver.

In a case where the digital signal transmission system effects transmission in superframes each comprising a plurality of frames each comprising a plurality of bits, stuffing is effected one frame at a time, and each stuffing signal identifies a superframe which contains a frame of stuffed information, such as in a DSI transmission system as discussed above, the step of producing the third signal preferably comprises the steps of: counting the number of superframes which occur between two consecutive stuffing signals; modifying said count in dependence upon the comparison of the relative phases of writing into and reading from the memory at the time of one of the stuffing signals; and frequency dividing the second signal by the product of the modified count and the number of frames in each superframe to produce the third signal.

The invention also provides, in a digital signal transmission system as recited above, the improvement comprising: means, including an oscillator, for generating a first signal at the first frequency; means for producing from the received signals a second signal at the second frequency; means for comparing the relative phases of writing into and reading from the memory in respect of each stuffing signal; means for producing a third signal at a frequency which is dependent upon the stuffing frequency modified in dependence upon each comparison of said relative phases; and means for controlling the oscillation frequency of the oscillator in dependence upon phase differences between the first signal and the second signal reduced in frequency by the frequency of the third signal.

For the sake of clarity, it is observed here that in the preferred embodiment of the invention described hereinafter the various frequencies referred to above have the following nominal and average values:

First frequency—1.536 MHz (=1.544 MHz×192/193)
Second frequency—1.536885 MHz
Stuffing frequency—885 Hz
Frequency of fourth and fifth signals—96000Hz (=1.536 MHz/16)
Fourth frequency—1.544 MHz The invention will be further understood from the following description of a preferred embodiment thereof with reference to the accompanying drawings, in which.

Figure 1:
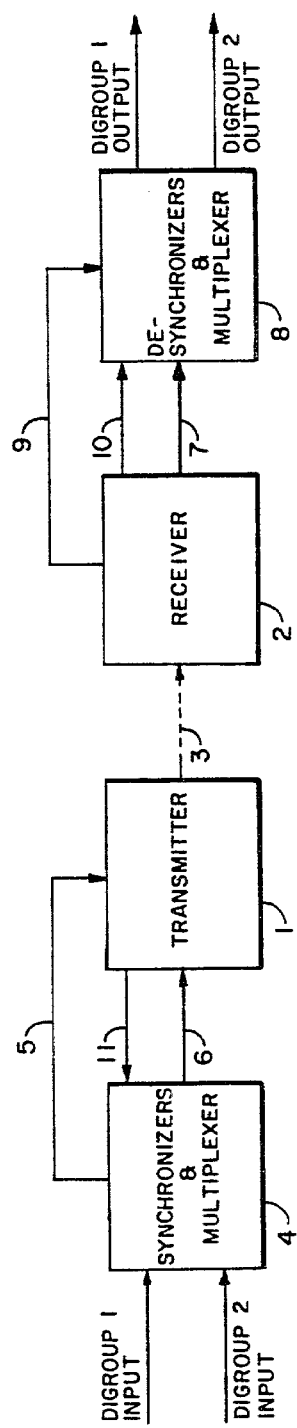
FIG. 1 is a very simplified block diagram of a digital signal transmission system.

Referring to FIG. 1, the digital signal transmission system illustrated therein serves to transmit two DS1 bit streams from a transmitter 1 to a receiver 2 via a transmission link 3. As is well known, a DS1 bit stream consists of frames each of 193 bits at a nominal bit rate of 1.544 Mbits/second, the 193 bits of each frame being constituted by 24 channels each of 8 bit PCM information and one synchronizing bit.

In the following description, it is assumed that the digital signal transmission system is a digital speech interpolation (DSI) transmission system as described in copending U.S. patent application Ser. No. 187,821 already referred to, by means of which the two DS1 bit streams are transmitted via the transmission link 3 also at a nominal bit rate of 1.544 Mbits/second. However, it should be appreciated that the present invention is also applicable to other DSI transmission systems and to other types of digital signal transmission systems.

As shown in FIG. 1, the two incoming DS1 bit streams, referenced digroup 1 input and digroup 2 input, are applied to a unit 4 which contains two synchronizers, one for each digroup, and a multiplexer. Each synchronizer synchronizes the respective bit stream to the internal timing of the transmitter in the manner described below, and supplies signalling and stuffing information to the transmitter via lines 5. The multiplexer multiplexes the 24 8-bit channels of each frame of each bit stream to produce on lines 6 48 channels, each of 8 bits, in each frame. For the DSI transmission, 27 frames constitute a superframe. However, the details of the DSI transmission form no part of this invention and accordingly need not be described here.

The receiver 2 supplies the received signals via lines 7 to a unit 8 which consists of a demultiplexer and two desynchronizers, which supply the respective bit streams to respective outputs referenced digroup 1 output and digroup 2 output. The receiver also supplies to the unit 8 signalling and destuffing information via lines 9, and timing signals via lines 10, to enable the desynchronizers to reconstruct the original bit streams. The transmitter 1 similarly supplies timing signals to the unit 4 via lines 11.

Figure 2:
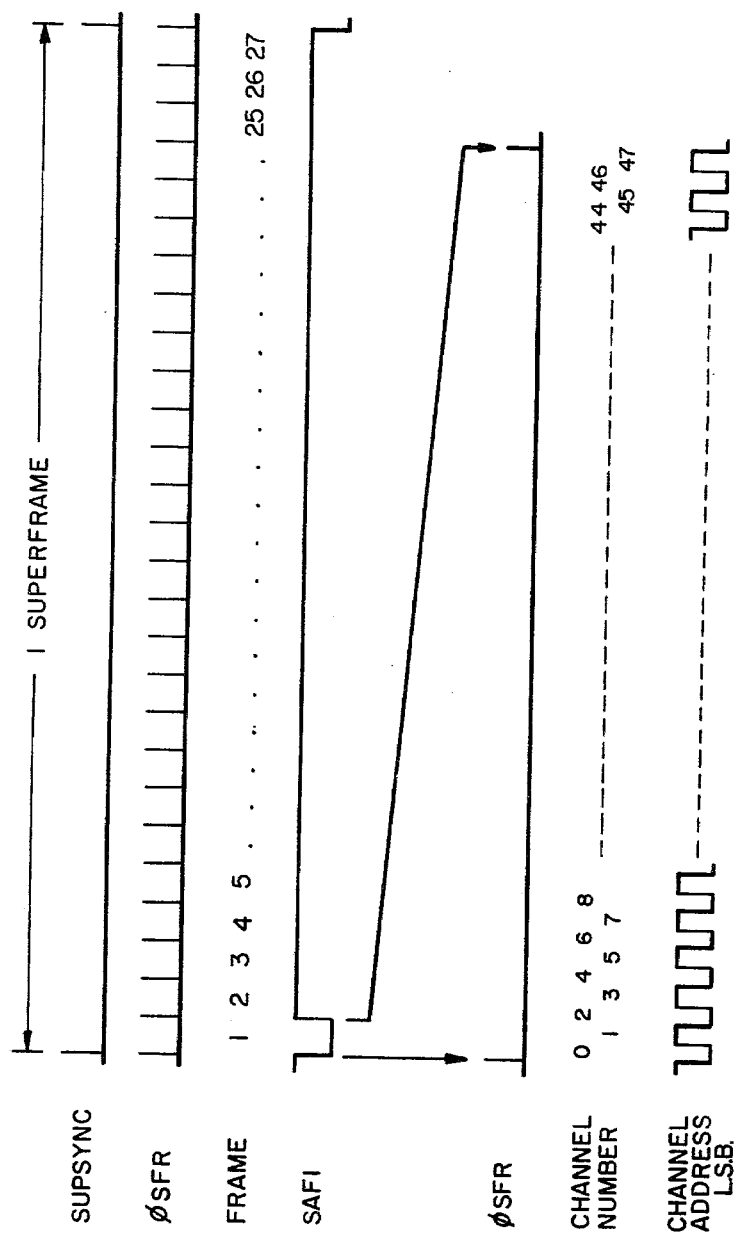
FIG. 2 illustrates timing signals relating to the operation of the system of FIG. 1.

In the DSI transmission system assumed here, the internal timing of the transmitter 1 is controlled predominantly by a 3.088 MHz clock signal. As already stated, in the transmitter superframes are formed each by 27 frames. Referring to FIG. 2, the start of each superframe is marked by a pulse of a signal SUPSYNC which pulse has a duration of 22 clock periods, and the start of each frame is marked by a pulse of a signal $\phi$SFR which pulse has a duration of 1 clock period. Between these pulses, in each frame, there are 8 clock periods for each of the 48 multiplexed channels. Thus each superframe comprises 22+(27−1)+27×8×48=10416 clock periods, and thus has a duration of 3.373 ms.

Referring again to FIG. 2, the <u>first</u> frame in each superframe is identified by a signal SAF1. In this frame, and in each other frame, a signal generator in the transmitter generates a 6-bit transmitter channel address which is stepped periodically through 48 bit combinations, corresponding to the 48 channels numbered 0 through 47 in FIG. 2, during the frame. FIG. 2 illustrates only the least significant bit (L.S.B.) of the channel address, which changes every 8 clock periods in each frame.

The synchronizers in the unit 4 in FIG. 1 are provided in order that the transmitter can accept two asynchronous input bit streams. Synchronizing is effected in a manner as described below which always results in positive stuffing, so that no information is lost. The positive stuffing is effected on a frame basis, one frame of information being stuffed at a time, so that there is a relatively very slow stuff rate. The desynchronizers in the unit 8 in FIG. 1 are provided in order to effect destuffing and reconstruction of the original bit streams.

Figure 3:
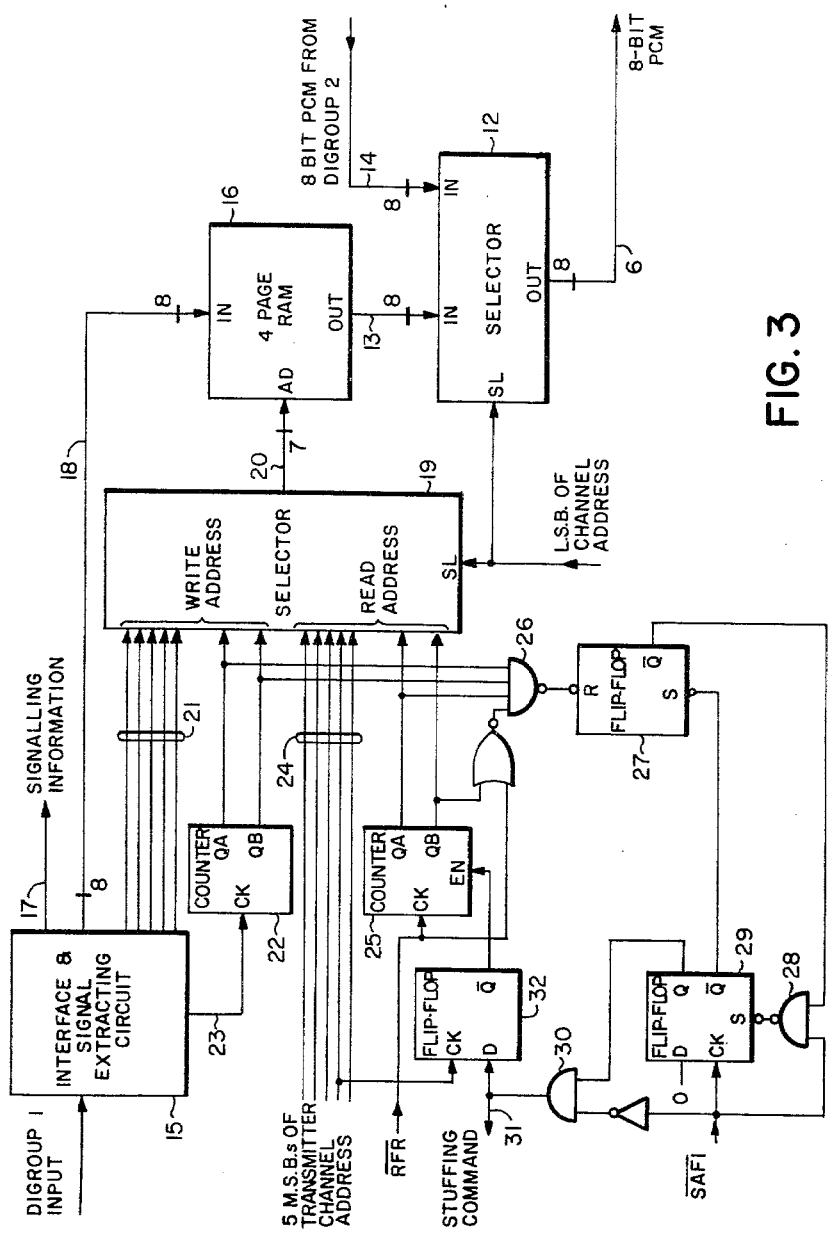
FIG. 3 illustrates a synchronizer and multiplexer of the system.

FIG. 3 illustrates in more detail one of the two synchronizers, and the multiplexer, of the unit 4. The multiplexer is constituted by an 8-bit selector 12 whose inputs are connected to outputs of the two synchronizers via lines 13 and 14 and whose output is connected to the lines 6. In FIG. 3 multiple lines are indicated by a single line on which is marked a bar with an adjacent numeral indicating the number of lines; e.g. each of the 8-bit wide parallel data lines 6, 13, and 14 in FIG. 3 is represented by a single line marked with a bar and an adjacent numeral 8.

The synchronizer shown in FIG. 3 includes an interface and signal extracting circuit 15, to which the digroup 1 input is applied, and a 4-page RAM (random access memory) 16 the output of which is connected to the lines 13. The circuit 15 extracts signalling information from the incoming bit stream and supplies this via lines 17, constituting some of the lines 5 in FIG. 1, to the transmitter 1. The circuit 15 also converts the channel information of the incoming bit stream into 8-bit wide parallel PCM data and supplies this via lines 18 to the input of the RAM 16.

The RAM 16 is addressed alternately with a write address and a read address which are applied to inputs of a selector 19 whose output is connected to an address input AD of the RAM 16 via lines 20. The selector 19 is controlled by the L.S.B. of the transmitter channel address applied to its select input SL; this L.S.B. is also applied to the select input SL of the selector 12, and is applied in inverted form to the select input of a selector, corresponding to the selector 19, in the other synchronizer to which the digroup 2 input is applied. The two synchronizers are otherwise identical. This arrangement provides that when information is being written into the RAM of one synchronizer, it is being read out from the RAM of the other synchronizer and being conducted via the multiplexer (selector 12) to the lines 6.

Each of the write and read addresses consists of a 5-bit channel address, identifying one of the 24 channels, and a 2-bit page address, identifying one of the 4 pages of the RAM. Each location in the RAM 16 serves to store an 8-bit PCM word. The circuit 15 supplies the write channel address via lines 21 to the selector 19, and once every incoming frame increments a write page counter 22, whose outputs QA and QB constitute the 2-bit write page address, via a line 23 connected to the clock input CK of the counter. The read channel address is constituted by the 5 most significant bits of the transmitter channel address, supplied to the selector 19 via lines 24. The read page address is constituted by the outputs QA and QB of a read page counter 25 which, provided that it is enabled by a logic 1 at its enabling input EN, is incremented once every transmitter frame by a signal $\overline{RFR}$ applied to its clock input CK.

Thus $24 \times 8 = 192$ of the 193 bits in each frame of the incoming bit stream are written into the RAM 16. The synchronizing bit of each frame is not stored in the RAM 16. As the incoming bit stream has a nominal bit rate of 1.544 Mbits/second, the average bit rate written into the RAM 16 is $1544000 \times 192/193 = 1536000$ bits per second. The average bit rate read out from the RAM 16 is $3088000 \times 5184/10416 = 1536885$ bits per second, because in each superframe $27 \times 24 \times 8 = 5184$ bits are read out from the RAM during the 10416 clock periods. Thus read out from the RAM 16 takes place on average 885 bits per second faster than write in, so that the synchronizer must provide a positive stuff rate of 885 bits/second. In fact stuffing is effected on a frame basis, 192 bits per time, as described below, so that stuffing is effected at an average rate of $885/192 = 4.6$ frames per second. As there are about 296 superframes per second, frame stuffing occurs on average about once every 64.5 superframes. These figures are based on nominal bit rates and clock frequencies, and in practice there is some departure from these so that frame stuffing may typically occur on average about once every 50 to 90 superframes.

In order to effect frame stuffing, the phases of the write and read addresses in the synchronizer are effectively compared by a NAND gate 26 which, when the read page approaches the write page, produces a logic 0 output which is supplied to the reset input R of a normally set flip-flop 27 to reset this flip-flop. The resulting logic 1 at the $\overline{Q}$ output of the flip-flop 27 enables a NAND gate 28 so that if or when the signal $\overline{SAF1}$ is a logic 1, i.e. other than during frame 1, a flip-flop 29 is set via its setting input S. The resulting logic 0 at the $\overline{Q}$ output of the flip-flop 29 returns the flip-flop 27 to its normally set state via its setting input S.

The logic 1 at the Q output of the set flip-flop 29 enables an AND gate 30 to produce a logic 1 stuffing command on a line 31, which constitutes another one of the lines 5 in FIG. 1, during the next frame 1. This logic 1 is also applied to the data input D of a flip-flop 32 which is clocked by the fourth most significant bit of the transmitter channel address so that its $\overline{Q}$ output becomes a logic 0. This $\overline{Q}$ output is connected to the enabling input EN of the read page counter 25, which is consequently not incremented by the next pulse of the signal $\overline{RFR}$. In consequence, during the stuffing command in this frame 1 the information read out from the RAM 16 is redundant; this information is ignored at the receiver as described below. At the end of this frame 1, the signal $\overline{SAF1}$ becomes a logic 1 to terminate the stuffing command and to trigger the flip-flop 29 via its clock input CK, so that the Q output of the flip-flop 29 adopts the logic 0 state which is applied to this flip-flop's data input D. The logic 0 at the output of the AND gate 30 is clocked into the flip-flop 32 so that the read page counter 25 is again enabled. Thus stuffing (repetition) of one frame, of 192 bits, is accomplished.

It is observed here that the above described stuffing takes place in the same manner, but completely independently, in the other synchronizer.

At the receiver 2, the received signals must be separated into the respective digroups and the original timing of each digroup must be reconstructed. This entails establishing frequency synchronism between the digroup input to the transmitter and the digroup output from the receiver, and is rendered difficult by the relatively slow stuffing rate.

Figure 4:
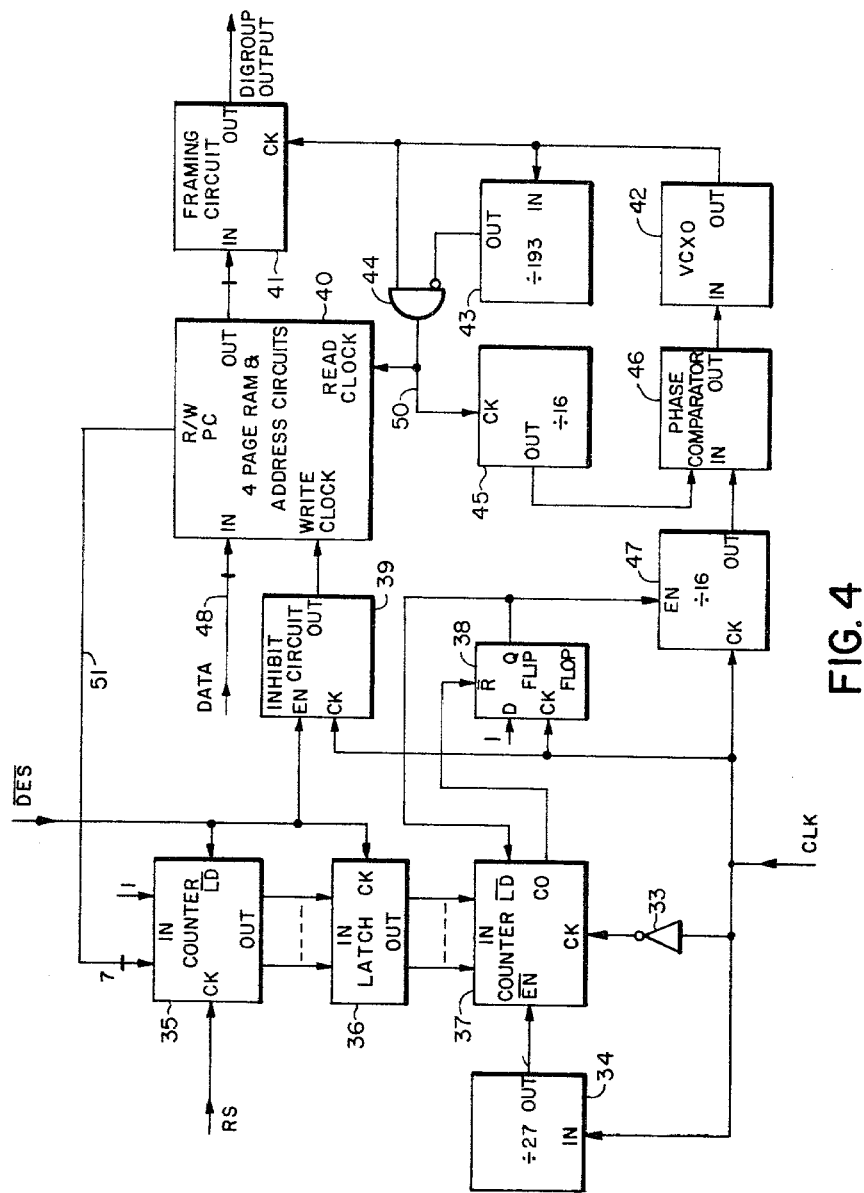
FIG. 4 illustrates a desynchronizer of the system.

FIG. 4 illustrates parts of one of the desynchronizers of the unit 8 in FIG. 1, and also shows an inverter 33 and a $\div 27$ frequency divider 34 which are provided commonly for the two desynchronizers. The parts of the desynchronizer illustrated in FIG. 4 comprise a counter 35; a programmable frequency divider constituted by a latch 36, a counter 37, and a D flip-flop 38; a clock inhibit circuit 39; a 4-page RAM, associated read and write address circuits, and a read/write phase comparator, shown as a single unit 40; a digroup framing circuit 41; a voltage-controlled crystal oscillator (VCXO) 42; a $\div 193$ frequency divider 43; a gate 44; two $\div 16$ frequency dividers 45 and 46; and a phase comparator 47.

The receiver 2 in FIG. 1 produces from the received signals a clock signal CLK, having an average clock frequency of 1.536885 MHz, a signal RS which comprises one pulse per superframe, and a destuffing command $\overline{DES} = 0$ whenever destuffing is to be effected for the relevant digroup in the current superframe. Via its enable input $\overline{EN}$ and the $\div 27$ frequency divider 34, the counter 37 is enabled to count only 1 in 27 of the pulses of the signal CLK which is applied to its clock input CK, and thus counts pulses at an average frequency of $1.536885 \text{ MHz} \div 27 = 56922$ Hz. The frequency division factor, 27, of the frequency divider 34 is selected to be equal to the number of frames in each superframe.

The signal CLK is applied to the clock input CK of the clock inhibit circuit 39, via which it is conducted unchanged when the signal $\overline{DES} = 1$ to the unit 40 to control the write into the RAM of the data for the relevant digroup supplied from the receiver via lines 48. With each destuffing command $\overline{DES} = 0$ the clock inhibit circuit 39 is inhibited throughout the first frame of the superframe, this always being the location of the stuffed frame, so that stuffed information is not written into the RAM. A reconstructed 1.544 MHz clock signal produced by the VCXO is supplied to a clock input CK of the framing circuit 41, and is also supplied to the input of, and gated in the gate 44 with the output of, the $\div 193$ frequency divider 45, to produce at the output of the gate 44 and on a line 50 a reconstructed 1.536 MHz clock signal which controls read-out of the information stored in the RAM to the framing circuit 41.

The required frequency synchronism of the VCXO 42 is achieved by comparing in the phase comparator 47 the phases of the outputs of the $\div 16$ frequency dividers 45 and 46, and controlling the frequency of the VCXO with the output of the phase comparator. The frequency divider 45 frequency-divides the reconstructed clock signal on the line 50 by 16 to produce an output signal at a nominal frequency of 96,000 Hz. The ÷16 frequency divider 46 is arranged to frequency-divide the signal CLK when it is enabled by the output Q of the flip-flop 38. On average, the signal CLK has a frequency of 1536885 Hz and, as described below, the divider 46 is arranged to be disabled at an average frequency of 885 Hz, so that the output of the divider 46 is at an average frequency of (1536885−885)/16=96000 Hz. In this average steady state, in which the phase comparator 47 is supplied with inputs at the same frequency, there is no change in the VCXO frequency.

As already described, the unit 40 includes a read/write phase comparator which, depending on the relative phases of reading from and writing into the RAM, produces a logic 1 or 0 at an output R/W PC and hence on a line 51. The counter 35 is a presettable 8-bit counter, to the 7 most significant presetting inputs of which the line 51 is connected and to the least significant presetting input of which a logic $\overline{1}$ is supplied. The signal $\overline{DES}$ is supplied to a load input $\overline{LD}$ of the counter 35, and the signal RS is supplied to its clock inut CK. Thus with each destuffing command $\overline{DES}=0$ the counter is preset to the count 00000001 or 11111111 depending on the prevailing read/write phase in the RAM. Between successive destuffing commands the counter 35 counts up pulses of the signal RS; i.e. the counter counts the number of superframes, modified by plus or minus 1 depending on the RAM read/write phase, between consecutive destuffing commands. Also with each destuffing command the latch 36 is clocked to store the count reached by the counter 35. The units 36, 37, and 38 operate in known manner as a programmable frequency divider which divides the frequency of 56922 Hz by a factor constituted by the count stored in the latch 36, to produce at the Q output of the flip-flop 38 the signal at an average frequency of 885 Hz for disabling the frequency divider 46. This signal produced at the Q output of the flip-flops 38 constitutes the third signal referred to herein.

It will be recalled that, on average and based on nominal figures, there are 64.5 superframes between successive frame stuffings. Since only the first frame of any superframe can be stuffed, in fact consecutive frame stuffings may occur 64 or 65 superframes apart. The modified count reached by the counter 35 will therefore be from 63 to 66. The output frequency of the programmable frequency divider will therefore be 56922/63, 64, 65, or 66 Hz, or in the range from 862 to 903 Hz. On average, over a large number of successive frame stuffings, this frequency will be the 885 Hz referred to above so that a stable situation is reached.

In practice, it will be appreciated that the frequency of the VCXO will be stepped between different frequencies as a result of the variable frequency of the signal supplied from the flip-flop 38 to the frequency divider 46, each step occurring on the occurrence of a destuffing command. Typically the VCXO frequency may change by an absolute maximum of 64 Hz with a minimum duration of any particular frequency of 170 ms. This frequency jitter, together with a maximum of about 120 ns rms jitter due to the internal jitter of the desynchronizer, is believed to be insufficient to affect subsequently connected equipment such as channel banks, multiplexers, and digital switches.

The invention is of course not limited to the particular embodiment described above, and numerous modifications, variations, and adaptations may be made without departing from the scope of the invention as defined in the claims.

For example, the modification of the count of the counter 35 in dependence upon the read/write phase comparison could be effected differently from the manner described, and the extent of modification of the count could be changed. Furthermore, it is within the scope of the invention to change entirely the manner in which the frequency of the oscillator 42 is controlled. For example, the read/write phase comparison can be monitored continuously and the frequency of the oscillator 42 controlled continuously without dependence directly on the stuffing signals, in dependence upon the relative phases of writing into and reading from the memory, the monitored phase difference being quantified and converted to an analot signal which is used to control the frequency of the oscillator 42. Various other ways in which the frequency of the oscillator can be controlled in dependence upon the read/write phase comparison will occur to persons skilled in the art and are likewise within the scope of the claims.

What is claimed is:

1. In a digital signal transmission system in which digital signals at a first frequency are synchronized with positive stuffing to a second, slightly higher, frequency for transmission, a stuffing signal is transmitted to identify the location of each item of stuffed information, and received signals at said second frequency are desynchronized to said first frequency by writing the received signals, but not the stuffed information, into a memory and reading signals from the memory at the first frequency, a method of producing a first signal at the first frequency at a receiver of the system comprising the steps of:
producing from the received signals a second signal at said second frequency;
comparing the relative phases of writing into and reading from the memory in respect of each stuffing signal;
producing a third signal at a frequency which is dependent upon the stuffing frequency modified in dependence upon each comparison of said relative phases;
generating said first signal using an oscillator; and
controlling the oscillation frequency of the oscillator in dependence upon phase differences between the first signal and the second signal reduced in frequency by the frequency of the third signal.

2. A method as claimed in claim 1 wherein the step of controlling the oscillation frequency of the oscillator comprises the steps of:
producing from the second and third signals a fourth signal having a frequency which is equal to the frequency difference of the second and third signals divided by a predetermined number;
frequency dividing the first signal by said predetermined number to produce a fifth signal; and
comparing the phases of the fourth and fifth signals to produce a control signal for controlling the oscillation frequency of the oscillator.

3. A method as claimed in claim 1, wherein the digital signal transmission system derives said digital signals at the first frequency from an incoming bit stream having a fourth frequency which is a predetermined amount higher than the first frequency, wherein the step of generating said first signal using the oscillator comprises the step of reducing the frequency of an output signal of the oscillator by said predetermined amount to produce the first signal, whereby said output signal of the oscillator has said fourth frequency.

4. A method as claimed in claim 1, 2 or 3, wherein the digital signal transmission system effects transmission in superframes each comprising a plurality of frames each comprising a plurality of bits, wherein stuffing is effected one frame at a time and wherein each stuffing signal identifies a superframe which contains a frame of stuffed information, wherein the step of producing the third signal comprises the steps of:

counting the number of superframes which occur between two consecutive stuffing signals;

modifying said count in dependence upon the comparison of the relative phases of writing into and reading from the memory at the time of one of the stuffing signals; and frequency dividing the second signal by the product of the modified count and the number of frames in each superframe to produce the third signal.

5. In a digital signal transmission system in which digital signals at a first frequency are synchronized with positive stuffing to a second, slightly higher, frequency for transmission, a stuffing signal is transmitted to identify the location of each item of stuffed information, and received signals at said second frequency are desynchronized to said first frequency by writing the received signals, but not the stuffed information, into a memory and reading signals from the memory at the first frequency, the improvement comprising:

means, including an oscillator, for generating a first signal at the first frequency;

means for producing from the received signals a second signal at the second frequency;

means for comparing the relative phases of writing into and reading from the memory in respect of each stuffing signal;

means for producing a third signal at a frequency whch is dependent upon the stuffing frequency modified in dependence uon each comparison of said relative phases; and means for controlling the oscillation frequency of the oscillator in dependence upon phase differences between the first signal and the second signal reduced in frequency by the frequency of the third signal.

6. A system as claimed in claim 5 wherein the controlling means comprises:

a first frequency divider responsive to the second and third signals to produce a fourth signal having a frequency which is equal to the frequency difference of the second and third signals divided by a predetermined number;

a second frequency divider arranged to frequency divide the first signal by said predetermined number to produce a fifth signal; and a phase comparator arranged to compare the phases of the fourth and fifth signals to produce a control signal for controlling the oscillation frequency of the oscillator.

7. A system as claimed in claim 5 in which said digital signals at the first frequency are derived from an incoming bit stream having a fourth frequency which is a predetermined amount higher than the first frequency, wherein the means for generating the first signal further includes frequency divider means for reducing the frequency of an output signal of the oscillator by said predetermined amount to produce the first signal, said output signal of the oscillator having said fourth frequency.

8. A system as claimed in claim 5, 6, or 7 in which transmission is effected in superframes each comprising a plurality of bits, stuffing is effected one frame at a time, and each stuffing signal identifies a superframe which contains a frame of stuffed information, wherein the means for producing the third signal comprises:

a counter for counting the number of superframes which occur between two consecutive stuffing signals;

means for modifying the count of the counter in dependence upon the comparison of the relative phases of writing into and reading from the memory at the time of one of the stuffing signals; and frequency divider means for frequency dividing the second signal by the product of the modified count of the counter and the number of frames in each superframe to produce the third signal.

* * * * *